United States Patent
Zhang et al.

(10) Patent No.: US 12,289,020 B2
(45) Date of Patent: Apr. 29, 2025

(54) ELECTRIC PUMP

(71) Applicant: ZHEJIANG SANHUA AUTOMOTIVE COMPONENTS CO., LTD., Zhejiang (CN)

(72) Inventors: Jun Zhang, Zhejiang (CN); Jupin Zheng, Zhejiang (CN); Shifeng Hu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 286 days.

(21) Appl. No.: 17/910,595

(22) PCT Filed: Mar. 10, 2021

(86) PCT No.: PCT/CN2021/079937
§ 371 (c)(1),
(2) Date: Sep. 9, 2022

(87) PCT Pub. No.: WO2021/185131
PCT Pub. Date: Sep. 23, 2021

(65) Prior Publication Data
US 2023/0127779 A1    Apr. 27, 2023

(30) Foreign Application Priority Data

Mar. 16, 2020  (CN) .......................... 202010181934.5
Dec. 3, 2020  (CN) .......................... 202011410931.0

(51) Int. Cl.
*H02K 11/00*  (2016.01)
*F04D 13/06*  (2006.01)
(Continued)

(52) U.S. Cl.
CPC ......... *H02K 11/33* (2016.01); *F04D 13/0606* (2013.01); *H02K 5/225* (2013.01); *H02K 2211/03* (2013.01)

(58) Field of Classification Search
CPC .... H02K 11/33; H02K 5/225; H02K 2211/03; H02K 11/40; H02K 11/30; H02K 1/12;
(Continued)

(56) References Cited

U.S. PATENT DOCUMENTS

2019/0277294 A1\*  9/2019  Hoshiko ............. F04D 13/0686
2020/0291947 A1    9/2020  Gootz et al.

FOREIGN PATENT DOCUMENTS

CN        101588088 A      11/2009
CN        101588089 A      11/2009
(Continued)

OTHER PUBLICATIONS

Japanese Office Action dated May 9, 2023 for Japanese Appl. No. 2002-523887.
(Continued)

*Primary Examiner* — Thomas Truong
(74) *Attorney, Agent, or Firm* — Ohlandt, Greeley and Perle, L.L.P.

(57) ABSTRACT

Disclosed is an electric pump, comprising a stator assembly, an electric control board assembly, and a conduction member capable of conducting electricity, wherein the stator assembly is electrically connected to the electric control board assembly; the stator assembly comprises a stator core; and the conduction member is electrically connected to a reference ground layer of the electric control board assembly and to the stator core, such that the influence of accumulated charges on the electric control board assembly is reduced, thereby improving the performance of the electric pump.

12 Claims, 14 Drawing Sheets

(51) Int. Cl.
*H02K 5/22* (2006.01)
*H02K 11/33* (2016.01)

(58) Field of Classification Search
CPC ............. F04D 13/0606; F04D 13/0686; F04D 13/0693; F04D 29/426; F04D 13/064
See application file for complete search history.

(56) References Cited

FOREIGN PATENT DOCUMENTS

| | | | |
|---|---|---|---|
| CN | 101588096 | A | 11/2009 |
| CN | 101588100 | A | 11/2009 |
| CN | 204334175 | U | 5/2015 |
| CN | 210240012 | U | 4/2020 |
| CN | 111434923 | A | 7/2020 |
| DE | 102014201488 | A1 | 7/2015 |
| DE | 102015211800 | A1 | 12/2015 |
| JP | 2003037956 | A | 2/2003 |
| JP | 2021134769 | A | 9/2021 |
| KR | 101915677 | B1 | 11/2018 |
| WO | 2019101304 | A1 | 5/2019 |

OTHER PUBLICATIONS

International Search Report dated May 6, 2021 for PCT Appl. No. PCT/CN2021/079937.
European Search Report dated Mar. 18, 2024 for European Application No. 21770745.4.

* cited by examiner

ELECTRIC PUMP

This application is the national phase of International Patent Application No. PCT/CN2021/079937, titled "ELECTRIC PUMP", filed on Mar. 10, 2021, which claims the benefit of priorities to the following two Chinese patent applications, all of which are incorporated herein by reference,
1) Chinese Patent Application No. 202010181934.5, titled "ELECTRIC PUMP", filed with the China National Intellectual Property Administration on Mar. 16, 2020; and
2) Chinese Patent Application No. 202011410931.0, titled "ELECTRIC PUMP", filed with the China National Intellectual Property Administration on Dec. 3, 2020.

FIELD

The present application relates to fluid pumps, and in particular to an electric pump.

BACKGROUND

An electric pump includes a stator assembly and an electric control board assembly, the stator assembly is electrically connected to the electric control board assembly, and electric components are provided on a circuit board. Generally, during the use of the electric pump, electric charges may accumulate in an external system or in the electric pump itself, and these accumulated charges may affect the performance and use of the electronic components, and thus may adversely affect the performance of the electric pump.

SUMMARY

An object according to the present application is to provide an electric pump, which is beneficial to reducing the adverse effect of accumulated charges on the performance of the electric pump.

In order to achieve the above object, the following technical solution is provided according to embodiments of the present application.

An electric pump includes a stator assembly and an electric control board assembly, the stator assembly is electrically connected to the electric control board assembly; the electric pump further includes a conduction member which is electrically conductive; the stator assembly includes a stator iron core, and the conduction member electrically connects a reference ground layer of the electric control board assembly with the stator iron core.

In the technical solution of the present application, the electric pump further includes the conduction member which is electrically conductive, and the conduction member electrically connects the reference ground layer of the electric control board assembly with the stator iron core. Since the stator iron core is connected to the reference ground layer, a potential difference is formed between the stator iron core and a surface of the electric control board assembly, which is beneficial to conducting the accumulated charges on the surface of the electric control board assembly to the stator iron core, reducing the adverse effect of accumulated charges on the electric control board assembly, and improving the performance of the electric pump.

DETAILED DESCRIPTION OF THE EMBODIMENTS

The present application is further illustrated hereinafter in conjunction with drawings and specific embodiments.

The electric pump in the following embodiments can provide a working medium of a vehicle thermal management system with the power to flow, wherein the working medium is 50% aqueous solution of ethylene glycol or clean water. Alternatively, the working medium may also be other substances.

Figure 1:
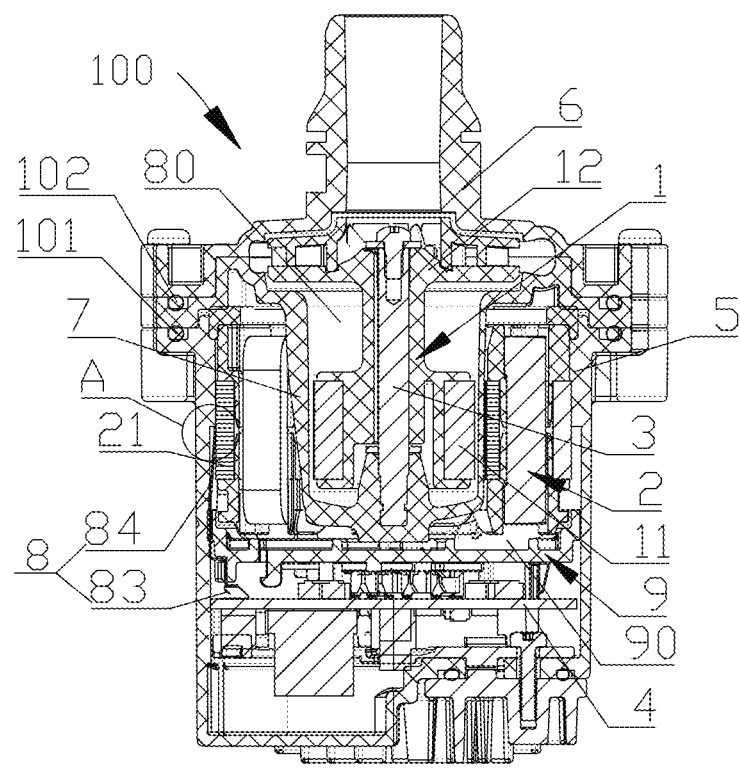
FIG. 1 is a schematic sectional view of a first embodiment of an electric pump according to the present application.

Referring to FIG. 1, an electric pump 100 includes a pump housing, a rotor assembly 1, a stator assembly 2, a pump shaft 3 and an electric control board assembly 4. The rotor assembly 1 is sleeved on an outer circumference of the pump shaft 3. The pump housing includes a first housing 5 and a second housing 6. The first housing 5 is relatively fixed to the second housing 6. A pump inner chamber is formed in the pump housing. The electric pump 100 further includes a separation portion 7. The pump inner chamber is separated into a first chamber 80 and a second chamber 90 by the separation portion 7. The working medium can flow through the first chamber 80, the second chamber 90 is not in direct contact with the working medium, the rotor assembly 1 is located in the first chamber 80, and the stator assembly 2 and the electric control board assembly 4 are located in the second chamber 90. In this embodiment, a first annular sealing ring 101 is provided at a connection between the first housing 5 and the separation portion 7, and a second annular sealing ring 102 is provided at a connection between the second housing 6 and the separation portion 7. Such arrangement of the first annular sealing ring 101 can prevent the working medium from seeping out from the connection between the first housing 5 and the separation portion 7. Such arrangement of the second annular sealing ring 102 can prevent the working medium from seeping out from the connection between the second housing 6 and the separation portion 7, and can prevent an external medium from seeping into the pump inner chamber. Referring to FIG. 1, the stator assembly 2 is electrically connected to the electric control board assembly 4, and the rotor assembly 1 includes a permanent magnet 11 and an impeller assembly 12. The electric control board assembly 5 controls the current passing through the stator assembly 2 to further control the excitation magnetic field generated by the stator assembly 2 when the electric pump 100 is working, and the rotor assembly 1 rotates around the pump shaft 3 under the action of the excitation magnetic field.

Figure 2:
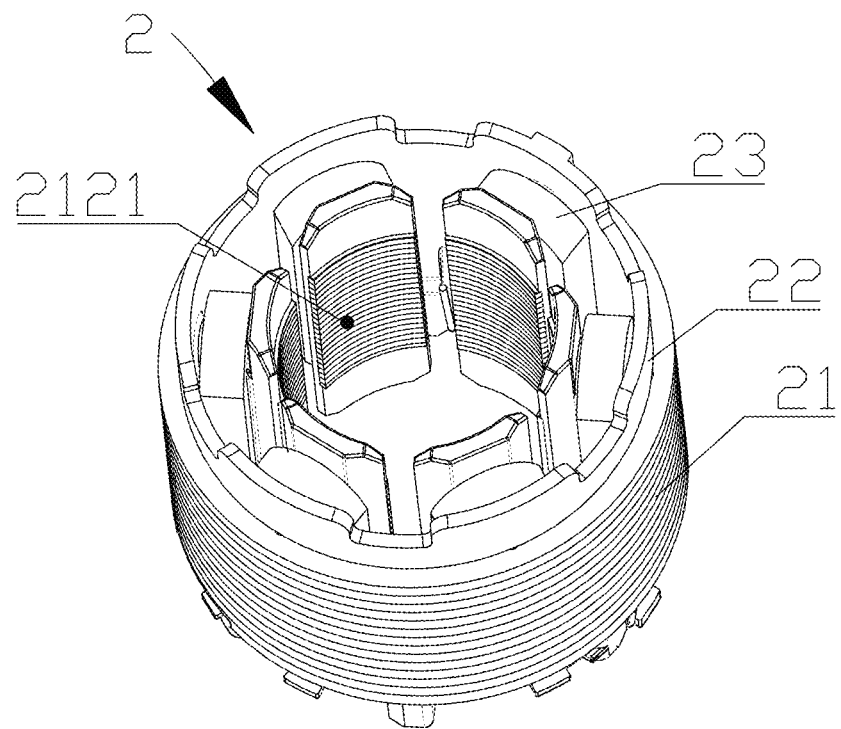
FIG. 2 is a schematic perspective view of a stator assembly in FIG. 1.
Figure 3:
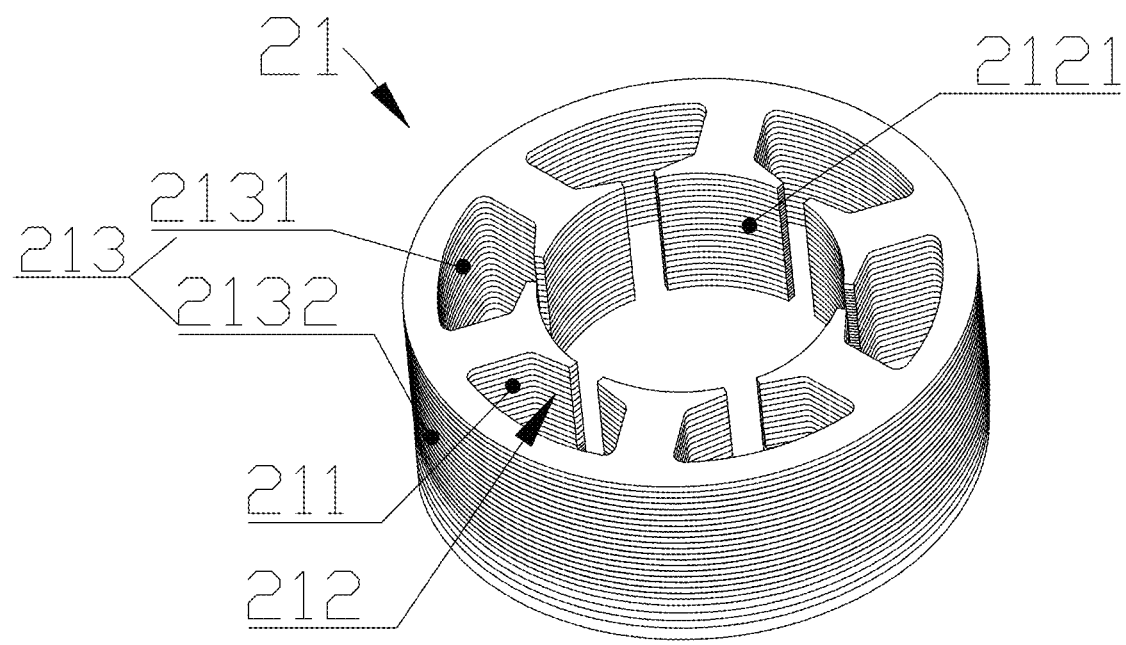
FIG. 3 is a schematic perspective view of a stator iron core in FIG. 2.
Figure 4:
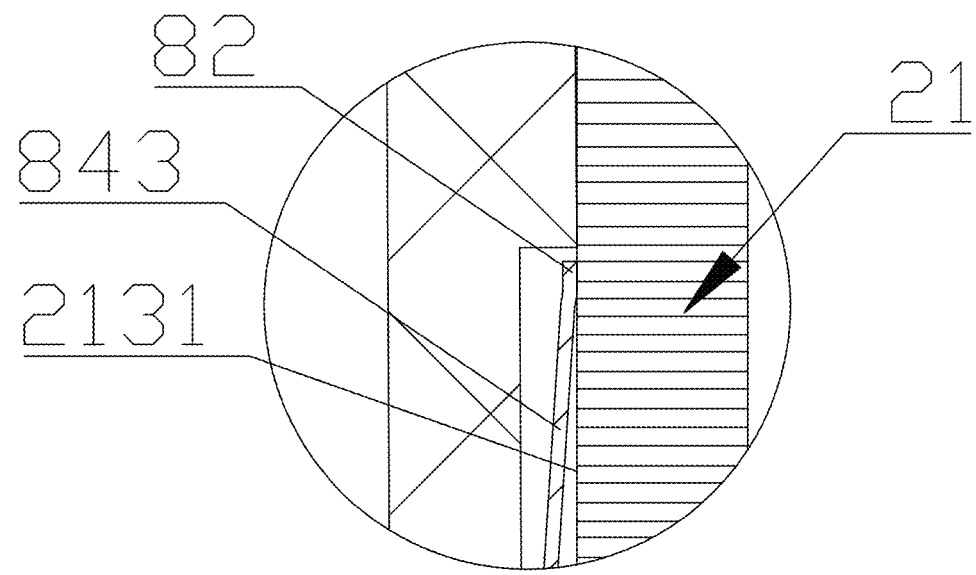
FIG. 4 is a schematic enlarged view of portion A in FIG. 1.

Referring to FIG. 2, the stator assembly 2 includes a stator iron core 21, an insulating frame 22 and at least three windings 23, the insulating frame 22 covers at least part of a surface of the stator iron core 21, the at least three windings 22 are wound around the insulating frame 23, and the at least three windings 23 are electrically connected to the electric control board assembly 4 in FIG. 1. Specifically, in this embodiment, the stator assembly 2 includes six windings 23. Alternatively, the stator assembly 2 may include other numbers of windings, such as three, nine or twelve. Referring to FIG. 3, the stator iron core 21 includes an iron core neck portion 211, an iron core shoe portion 212 and an iron core yoke portion 213, the iron core yoke portion 213 is arranged on at least part of an outer circumference of the iron core neck portion 211, the iron core shoe portion 212 is connected to the iron core yoke portion 213 by the iron core neck portion 211, and the iron core neck portion 211 provides support for the winding of the windings 23 in FIG. 2. In this embodiment, the number of the iron core neck portions 211 is the same as the number of the windings 23 in FIG. 2.

Referring to FIG. 1, FIG. 1 is a schematic structural view of a first embodiment of the electric pump according to the present application, and the structure of the first embodiment of the electric pump will be described in detail below.

Referring to FIGS. 1 to 5, the electric pump 100 further includes a conduction member 8 which is electrically conductive; the conduction member 8 includes a first connecting end 81 and a second connecting end 82, the first connecting end 81 is electrically connected to a reference ground layer of the electric control board assembly 4, the second connecting end 82 is electrically connected to the stator iron core 21, and the reference ground layer of the electric control board assembly 4 is electrically connected with the stator iron core 21 via the conduction member 8. Since the stator iron core 21 is electrically connected with the reference ground layer, a potential difference is formed between the stator iron core 21 and a surface of the electric control board assembly 4, which is beneficial to conducting the accumulated charges on the surface of the electric control board assembly 4 to the stator iron core 21, reducing the adverse effect of accumulated charges on the electronic components in the electric control board assembly 4, further reducing the adverse effect of accumulated charges on the electric pump and improving the electromagnetic compatibility of the electric pump. The accumulated charges here include static electricity and electromagnetic interference generated by the electric control board assembly itself. In order to ensure that the accumulated charges can be conducted to the stator iron core 21, two embodiments are provided here. In a first embodiment, at least part of the surface of the stator iron core 21 and the surface of the electric control board assembly 4 are located in a same chamber, and an air passage is arranged between the surface of the stator iron core 21 and the surface of the electric control board assembly 4 in advance. In a second embodiment, the electric pump is further provided with a conductive member, and the surface of the stator iron core 21 is connected to the surface of the electric control board assembly 4 via the conductive member, and a structure of the conductive member may be the same as a structure of the conduction member. The above first embodiment is described below, wherein the surface of the stator iron core 21 and the surface of the electric control board assembly 4 are located in the second chamber 90.

Referring to FIGS. 1 to 5, in this embodiment, the second connecting end 82 is in contact with the iron core yoke portion 213. Specifically, referring to FIG. 1 and FIG. 3, the iron core yoke portion 213 includes an inner circumferential surface 2131 and an outer circumferential surface 2132, and the inner circumferential surface 2131 of the iron core yoke portion 213 is closer to an axial central axis of the stator iron core 21 than the outer circumferential surface 2123. The second connecting end 82 is in contact with the outer circumferential surface 2132 of the iron core yoke portion 213.

Figure 5:
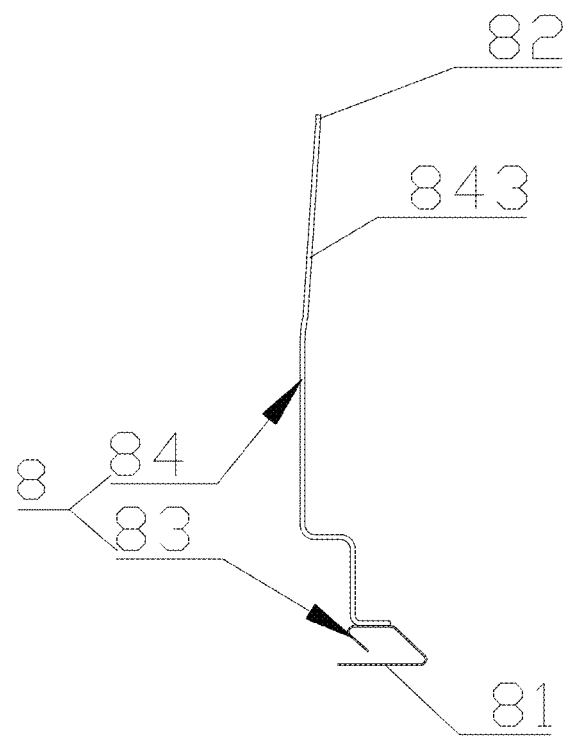
FIG. 5 is a schematic front view of a conduction member in FIG. 1.
Figure 6:
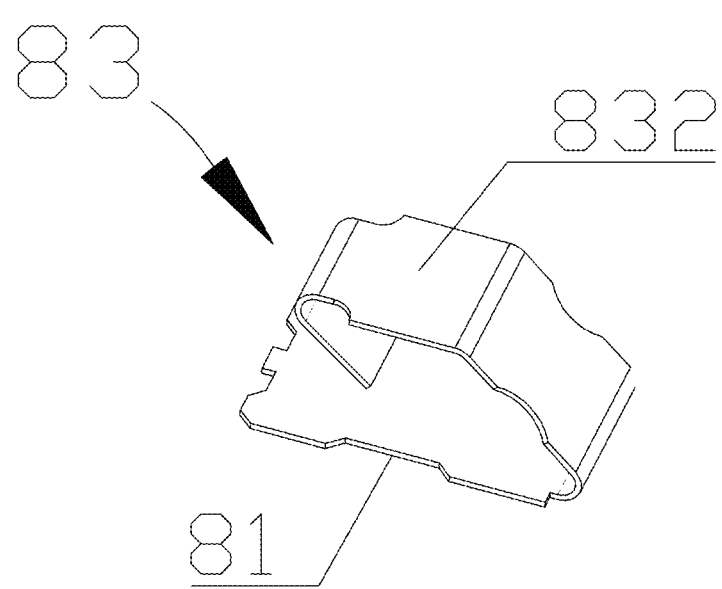
FIG. 6 is a schematic perspective view of a first conductive portion in FIG. 5.
Figure 7:
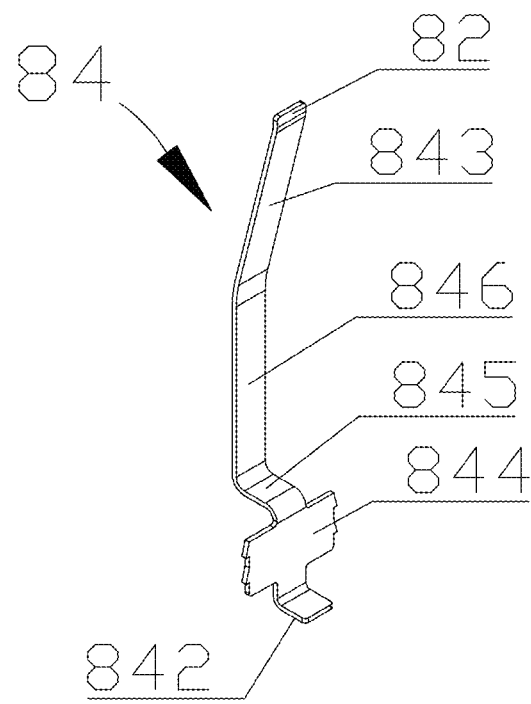
FIG. 7 is a schematic perspective view of a second conductive portion in FIG. 5.
Figure 8:
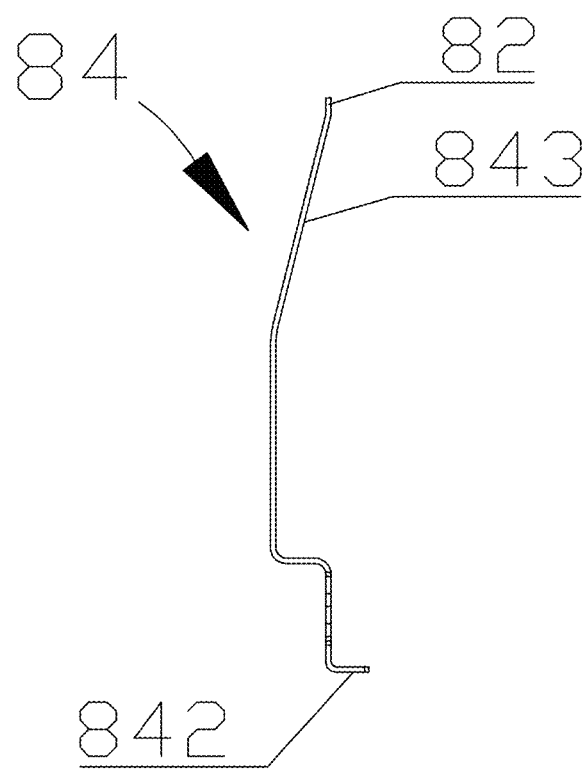
FIG. 8 is a schematic front view of the second conductive portion in FIG. 7.

Referring to FIG. 1 and FIGS. 5 to 8, in this embodiment, the conduction member 8 includes a first conductive portion 83 and a second conductive portion 84, and the first conductive portion 83 and the second conductive portion 84 are separately arranged. The "separately arranged" here means that the first conductive portion 83 and the second conductive portion 84 are separately processed into two independent components, and then are assembled with each other. Referring to FIGS. 6 to 8, in this embodiment, the first connecting end 81 is located at a first end of the first conductive portion 83, the second connecting end 82 is located at a first end of the second conductive portion 84, and a second end 832 of the first conductive portion 83 is in contact with a second end 842 of the second conductive portion 84. Specifically, in this embodiment, the second end 832 of the first conductive portion 83 is in direct contact with the second end 842 of the second conductive portion 84, or the second end 832 of the first conductive portion 83 is in indirect contact with the second end of the second conductive portion 84 via a conductive adapter. In this embodiment, the conduction member 8 includes the first conductive portion 83 and the second conductive portion 84, and the first conductive portion 83 and the second conductive portion 84 are separately arranged. Apparently, the first conductive portion 83 and the second conductive portion 84 may be integrally arranged. The "integrally arranged" here means that the first conductive portion 83 and the second conductive portion 84 are processed into one component. Apparently, the conduction member 8 may only include the second conductive portion 84, that is, the conduction member 8 is composed of one component, for which reference can be made to a second embodiment and a third embodiment of the electric pump of the present application. Alternatively, the conduction member 8 may be composed of two or more components.

Referring to FIG. 1 and FIGS. 5 to 8, at least one of the first conductive portion 83 and the second conductive portion 84 is an elastic member. Specifically, in this embodiment, the first conductive portion 83 and the second conductive portion 84 are both elastic members. A height of the first conductive portion 83 is defined as a use height when the first end of the first conductive portion 83 is electrically connected to the reference ground layer of the electric control board assembly 4 and the second end 832 of the first conductive portion 83 is in contact with the second end 842 of the second conductive portion 84. The use height of the first conductive portion 83 is less than a height of the first conductive portion 83 in a natural state, that is, the first conductive portion 83 is subjected to a positive pressure from the second conductive portion 84 when the second end 832 of the first conductive portion 83 is in contact with the second end 842 of the second conductive portion 84, so that the first conductive portion 83 is compressed, and thus, the use height of the first conductive portion 83 is less than the height of the first conductive portion 83 in the natural state. Such arrangement, on one hand, is beneficial to improving the reliability of the contact between the first conductive portion 83 and the reference ground layer of the electric control board assembly 4 and the reliability of the contact between the first conductive portion 83 and the second conductive portion 84, so that the accumulated charges can be conducted through the first conductive portion 83 and the second conductive portion 84. On the other hand, since the stator assembly 2 and/or the electric control board assembly 4 and/or the first conductive portion 83 and/or the second conductive portion 84 may have height errors during processing, manufacturing and assembly, the elastic first conductive portion 83 and the elastic second conductive portion 84 are beneficial to adapting to the height errors of the stator assembly 2 and/or the electric control board assembly 4 and/or the first conductive portion 83 and/or the second conductive portion 84 during processing, manufacturing and assembly, and further improving the reliability of the contact between the conduction member and the stator iron core 21 and the reliability of the contact between the conduction member and the electric control board assembly 4.

Referring to FIG. 1 and FIGS. 4 to 8, the second conductive portion 84 includes an inclined section 843, and the inclined section 843 and the second connecting end 82 are integrally arranged. In this embodiment, the second connecting end 82 is vertical, and the second connecting end 82 is obliquely arranged with respect to the inclined section 843. Apparently, the second connecting end 82 may also be inclined and obliquely arranged with respect to the inclined section 843; or, the second connecting end 82 is used as an extending section of the inclined section 843 and is arranged in parallel or coincident with the inclined section 843. The arrangement of the second connecting end 82 here is not limited to the above methods. Referring to FIGS. 1 to 5, the inclined section 843 is obliquely arranged with respect to the outer circumferential surface 2132 of the iron core yoke portion 213 of the stator iron core 21, and the outer circumferential surface 2132 of the iron core yoke portion 213 is an outer circumferential surface of the stator iron core. In this embodiment, an outer side surface of the inclined section 843 is in contact with the first housing 5, and the first housing 5 exerts a force on the inclined section 843. Since the inclined section 843 is obliquely arranged with respect to the stator iron core 21, the inclined section 843 and the second connecting end 82 are integrally arranged, and the second connecting end 82 is in contact with the outer circumferential surface 2132 of the iron core yoke portion 213 in FIG. 3, the second connecting end 82 better abuts against the outer circumferential surface 2132 of the iron core yoke portion 213 of the stator iron core 21, which is beneficial to improving the reliability of the contact between the second connecting end 82 and the stator iron core 21.

In addition, referring to FIGS. 1 to 3, in this embodiment, the stator assembly 2 and the first housing 5 are separately arranged. The "separately arranged" here means that the stator assembly 2 and the first housing 5 are separately processed into two separate components and then are assembled with each other. Apparently, the stator assembly 2 and the first housing 5 may be integrally formed by injection molding, which specifically includes the following two ways, the first way is that, at least the stator assembly 2 is used as an insert to form the first housing 5 by injection molding. In this way, at least part of the outer circumferential surface 2132 of the iron core yoke portion 213 of the stator iron core 21 can be exposed, and the exposed outer circumferential surface of the iron core yoke portion 213 can be configured to contact with the second connecting end 82 of the conduction member 8 in FIG. 5, so that the stator iron core 21, the conduction member 8 and the reference ground layer of the electric control board assembly 4 can form a conductive passage, which is beneficial to reducing the adverse effect of the accumulated charges on the electronic components in the electric control board assembly 4, and further reducing the adverse effect of the accumulated charges on the performance of the electric pump and on the other hand, improving the electromagnetic compatibility of the electric pump for the charges generated by the electromagnetic interference; the second way is that, the stator iron core 21 is first fixedly connected or limited to the second connecting end 82 of the conduction member 8. In this way, the stator iron core 21 may be fixed to the second connecting end 82 of the conduction member 8 by bonding, clamping, or the like, and then the stator assembly 2 and at least part of the conduction member 8 are used as inserts to form the first housing 5 by injection molding. In addition, in this embodiment, the pump shaft 3 is used as an insert to form the separation portion 7 by injection molding, and the separation portion 7 and the first housing 5 are separately arranged. Apparently, the separation portion 7 and the stator assembly 2 may be integrally arranged, or the separation portion 7, the stator assembly 2 and the first housing 5 may be integrally arranged. As for more details, reference can be made to the detailed description of a third embodiment of the electric pump below, and those details will not be repeated here.

Figure 9:
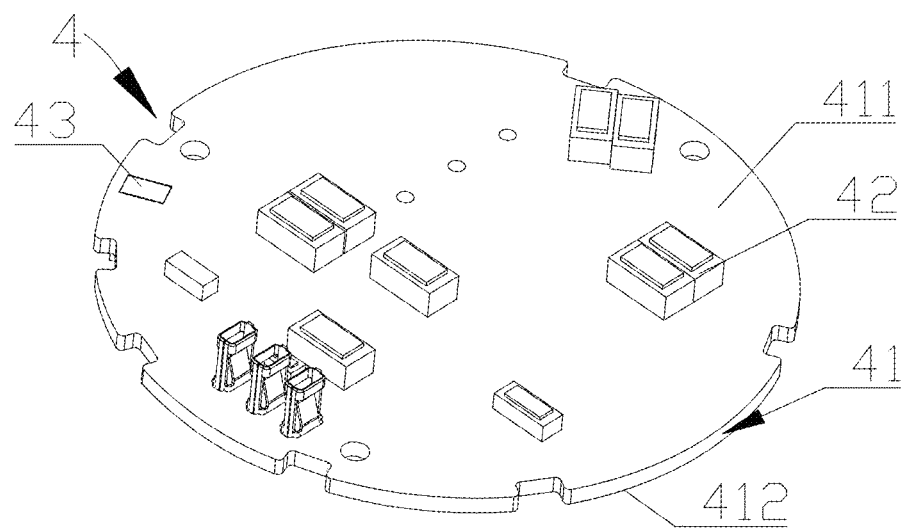
FIG. 9 is a schematic perspective view of an electric control board assembly in FIG. 1.
Figure 10:
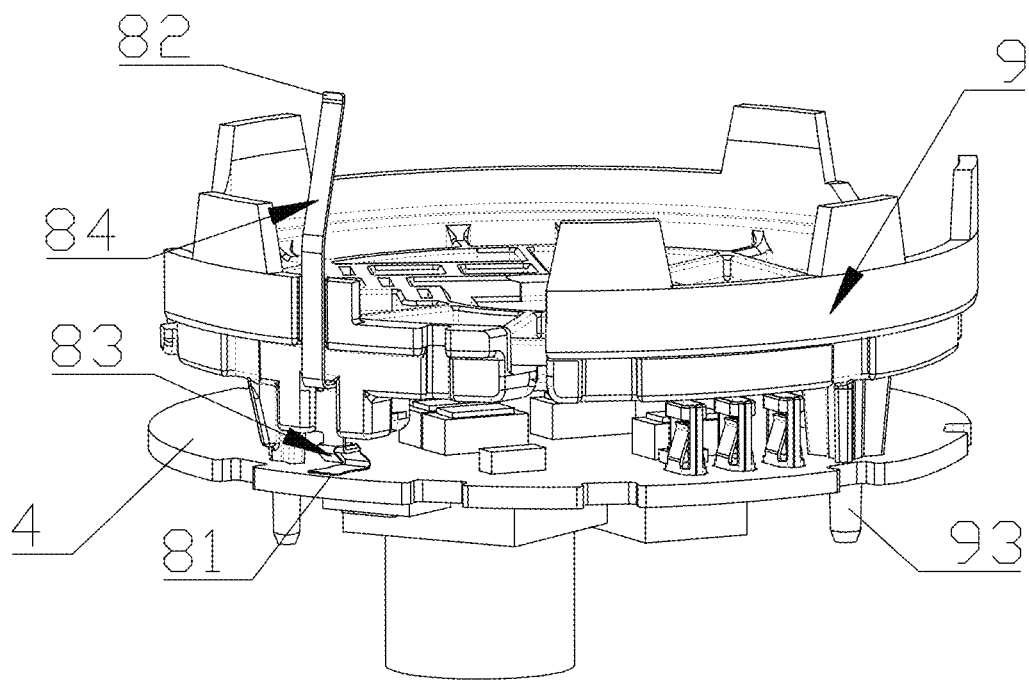
FIG. 10 is a schematic perspective view of an assembly of the electric control board assembly, a fixing portion and the conduction member in FIG. 1.

Referring to FIG. 9 and FIG. 10, the electric control board assembly 4 includes a base board 41 and electronic components 42 arranged on the base board 41. The base board 41 includes a first surface 411 and a second surface 412, and the first surface 411 is closer to the stator assembly 2 in FIG. 1 than the second surface 412. The electric control board assembly 4 further includes an abutting portion 43, the abutting portion 43 is arranged on the first surface 411, the abutting portion 43 is electrically connected to the reference ground layer of the electric control board assembly 4, and the first connecting end 81 in FIG. 5 is in contact with the abutting portion 43 and is electrically connected to the abutting portion 43. In this embodiment, a conductive layer is formed on a surface of the abutting portion 43, wherein the conductive layer may be formed by tin plating, electroless nickel plating or gold immersion, which is beneficial to improving the conductivity between the abutting portion 43 and the first connecting end 81 in FIG. 6. Apparently, the abutting portion 43 may be processed into a separate component and then be fixedly connected to the base board 41, and in this case the abutting portion 43 may be a conductive metal sheet or other conductive structure. Referring to FIG. 6, FIG. 9 and FIG. 10, in this embodiment, the first end of the first conductive portion 83 is the first connecting end 81, the first connecting end 81 is welded to the abutting portion 43, the second end 832 of the first conductive portion 83 is a cantilever end, and the second end 832 of the first conductive portion 83 abuts against the second conductive portion 84.

Figure 11:
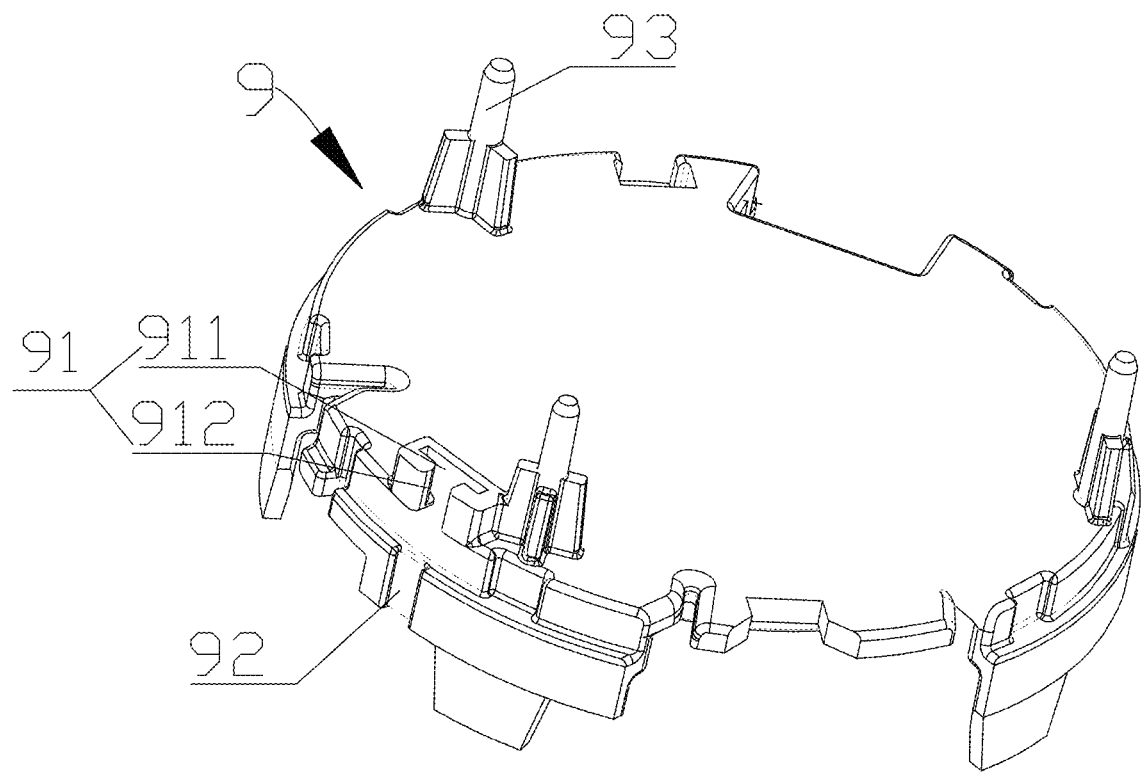
FIG. 11 is another schematic perspective view of FIG. 10.
Figure 12:
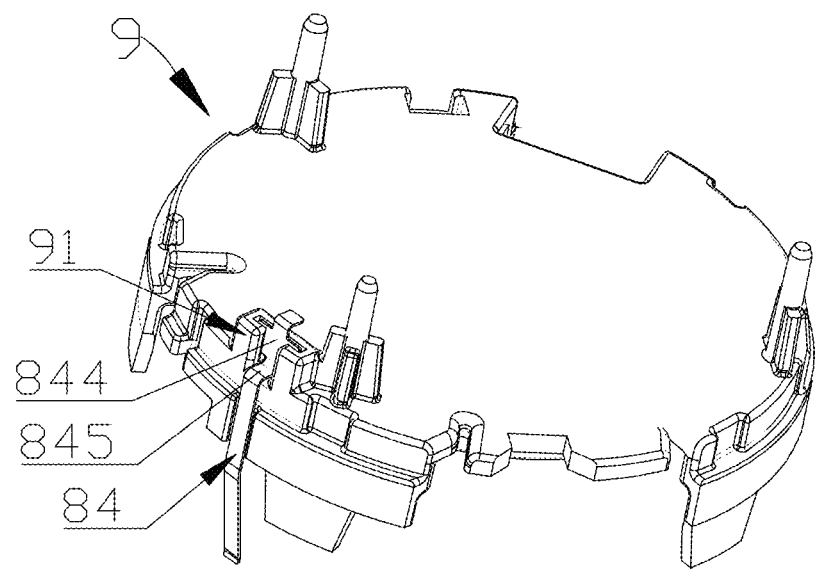
FIG. 12 is a schematic perspective view of an assembly of the fixing portion and the conduction member in FIG. 10.

Referring to FIG. 1, FIG. 10 and FIG. 12, the electric pump 100 further includes a limiting portion 9, the limiting portion 9 is located between the electric control board assembly 4 and the stator iron core 21, the first connecting end 81 is located on one side of the limiting portion 9, and the second connecting end 82 is located on another side of the limiting portion 9. The limiting portion 9 includes a first limiting groove 91, the first limiting groove 91 extends along an axial direction of the limiting portion 9, and the first limiting groove 91 is closer to an edge of the limiting portion 9 than to the center of the limiting portion 9. Referring to FIG. 11, the first limiting groove 91 includes a large groove portion 911 and a notch portion 912, the large groove portion 911 is in communication with the notch portion 912, and a width of the large groove portion 911 is greater than a width of the notch portion 912. Referring to FIG. 5, FIG. 7, FIG. 8 and FIG. 12, the conduction member 8 further includes a first limiting section 844, a bent section 845 and a second limiting section 846, the first limiting section 844, the bent section 845 and the second limiting section 846 are integrally arranged, the first limiting section 844 is connected to the second limiting section 846 by the bent section 845, and the second limiting section 846 is closer to the inclined section 843 than the first limiting section 844. In this embodiment, the first limiting section 844, the bent section 845 and the second limiting section 846 are formed on the second conductive portion 84. Specifically, the first limiting section 844, the bent section 845 and the second limiting section 846 are located between the first end of the second conductive portion 84 and the second end 842 of the second conductive portion 84, and referring to FIG. 12, at least part of the first limiting section 844 extends into the large groove portion 911, a width of the first limiting section 844 is greater than the width of the notch portion 912, the first limiting section 844 is tightly fitted with the large groove portion 911, and at least part of the bent section 845 is located in the notch portion 912. The above methods are beneficial to limiting the second conductive portion 84 in a radial direction and an axial direction, so as to prevent the second conductive portion 84 from moving in the radial direction and the axial direction. Referring to FIG. 11, the limiting portion 9 further includes a second limiting groove 92, and the second limiting groove 92 extends along the axial direction of the limiting portion 9. In this embodiment, the second limiting groove 92 is closer to the stator iron core 21 in FIG. 1 than the first limiting groove 91, and the second limiting groove 92 is closer to the edge of the limiting portion 9 than to the center of the limiting portion 9. Referring to FIG. 12, at least part of the second limiting section 846 is located in the second limiting groove 92, which is beneficial to increasing an axial supporting area between the second conductive portion 84 and the limiting portion 9 and further preventing the second conductive portion 84 from shaking.

Referring to FIG. 11 and FIG. 12, the limiting portion 9 includes at least two positioning columns 93, which protrude from a surface of the limiting portion 9 toward the electric control board assembly 4 in FIG. 1, and referring to FIG. 10, the positioning columns 93 are arranged corresponding to through holes in the electric control board assembly 4, so that the electric control board assembly 4 can be positioned and mounted. In this embodiment, the limiting portion 9 includes three positioning columns 93, and the three positioning columns 93 are non-uniformly distributed along a circumferential direction of the limiting portion 9, so that the electric control board assembly 4 has a unique mounting direction during mounting, which is beneficial to avoiding mis-installation. In addition, in this embodiment, the limiting portion 9 and the first housing 5 are separately arranged. Apparently, the limiting portion 9 and the first housing 5 may be integrally arranged. As for the specific structure, reference can be made to fourth and fifth embodiments of the electric pump, and the specific structure will not be repeated here.

Figure 13:
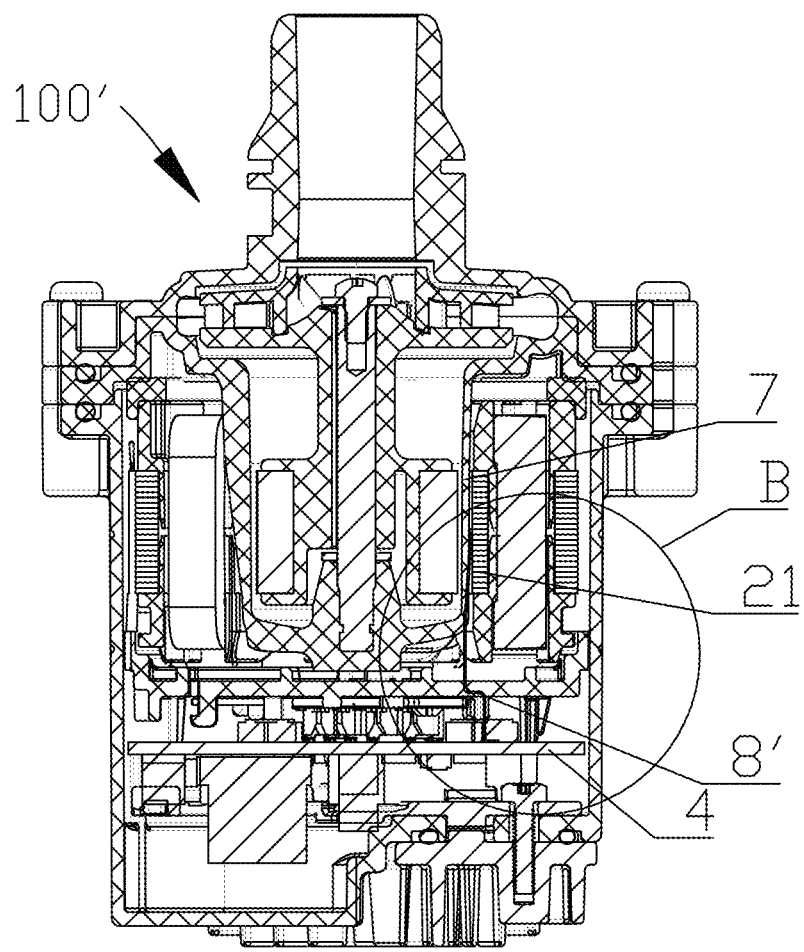
FIG. 13 is schematic sectional view of a second embodiment of the electric pump according to the present application.
Figure 14:
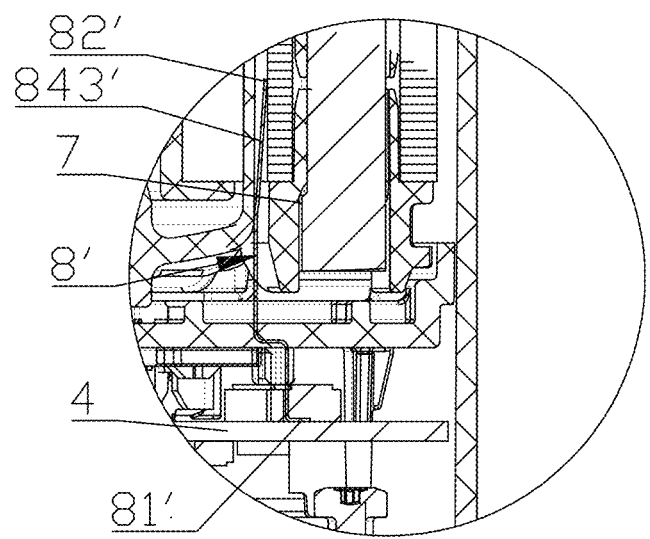
FIG. 14 is a schematic enlarged view of portion B in FIG. 13.

Referring to FIG. 13 and FIG. 14, FIG. 13 and FIG. 14 are schematic structural views of the second embodiment of the electric pump according to the present application, and the structure of the second embodiment of the electric pump will be described in detail below.

Referring to FIG. 13 and FIG. 14, an electric pump 100' includes a conduction member 8'. In this embodiment, a first connecting end 81' of the conduction member 8' is connected to the reference ground layer of the electric control board assembly 4, and a second connecting end 82' of the conduction member 8' is in contact with the inner circumferential surface 2121 of the iron core shoe portion 212 in FIG. 2 and FIG. 3. The inner circumferential surface 2121 of the iron core shoe portion 212 herein is the inner circumferential surface of the stator iron core 21. Therefore, the stator iron core 21, the conduction member 8' and the reference ground layer of the electric control board assembly 4 can form a conductive passage for the accumulated charges. Since the stator iron core 21 is electrically connected with the reference ground layer of the electric control board assembly 4 through the conduction member 8', a potential difference is formed between the stator iron core 21 and the surface of the electric control board assembly 4, which is beneficial to conducting the accumulated charges on the surface of the electric control board assembly 4 to the stator iron core 21, reducing the adverse effect of accumulated charges on the electronic components in the electric control board assembly 4, further reducing the adverse effect of accumulated charges on the electric pump and improving the electromagnetic compatibility of the electric pump. The accumulated charges here include static electricity and electromagnetic interference generated by the electric control board assembly 4 itself. Referring to FIG. 14, in this embodiment, the conduction member 8' is an integral member. Apparently, the conduction member 8' may be composed of two or more components, which can specifically refer to the first embodiment of the electric pump, and will not be repeated here.

Referring to FIG. 14, the conduction member 8' is an elastic member, the conduction member 8' includes an inclined section 843', a front portion of the inclined section 843' is connected to the second connecting end 82', and the inclined section 843' and the second connecting end 82' are integrally arranged. In this embodiment, the second connecting end 82' is vertical, and the second connecting end 82' is obliquely arranged with respect to the inclined section 843'. Apparently, the second connecting end 82' may also be inclined and obliquely arranged with respect to the inclined section 843'; or, the second connecting end 82' is used as an extending section of the inclined section 843' and is arranged in parallel or coincident with the inclined section 843'. The arrangement of the second connecting end 82' here is not limited to the above methods. The inclined section 843' is located between the first connecting end 81' and the second connecting end 82', the inclined section 843' is closer to the second connecting end 82' than the first connecting end 81', and the inclined section 843' is obliquely arranged with respect to the inner circumferential surface 2121 of the iron core shoe portion 212 of the stator iron core 21. In this embodiment, an outer side surface of the inclined section 843' is in contact with the separation portion 7, so that the separation portion 7 can exert a force on the outer side surface of the inclined section 843'. Since the inclined section 843' is obliquely arranged with respect to the inner circumferential surface 2121 of the iron core shoe portion 212 of the stator iron core 21, the second connecting end 82' is in contact with an end surface of the iron core shoe portion, which is beneficial to improving the reliability of the contact between the second connecting end 82' and the inner circumferential surface 2121 of the iron core shoe portion 212 of the stator iron core 21.

Compared with the first embodiment of the electric pump, in this embodiment, the second connecting end 82' of the conduction member 8' is in contact with the inner circumferential surface 2121 of the iron core shoe portion 212 in FIG. 2 and FIG. 3, and the conduction member 8' is an integral member. Other structural features in this embodiment can refer to the first embodiment of the electric pump, which will not be repeated here.

Figure 15:
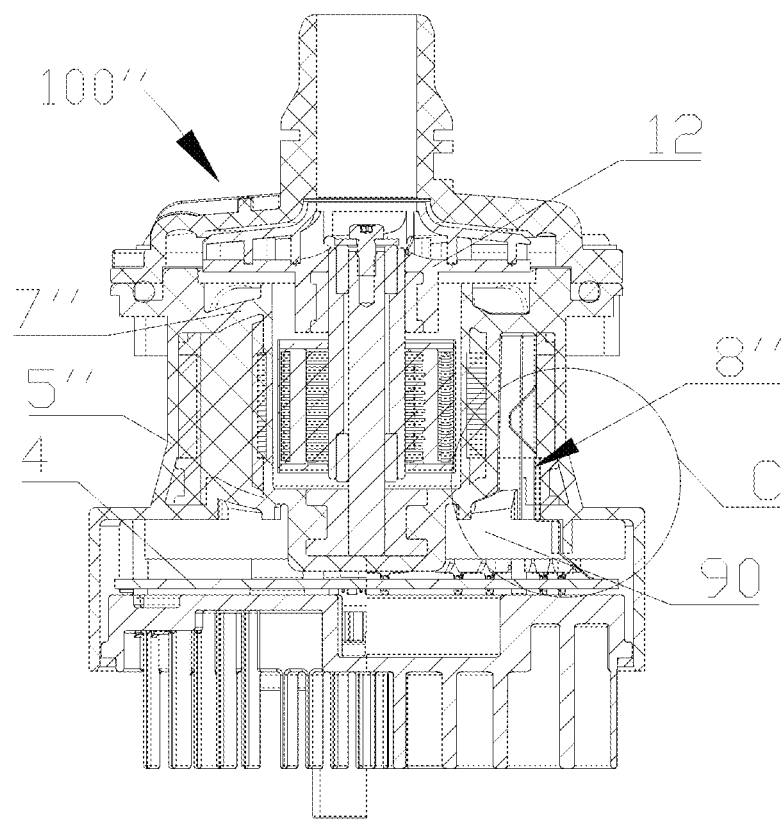
FIG. 15 is a schematic sectional view of a third embodiment of the electric pump according to the present application.
Figure 16:
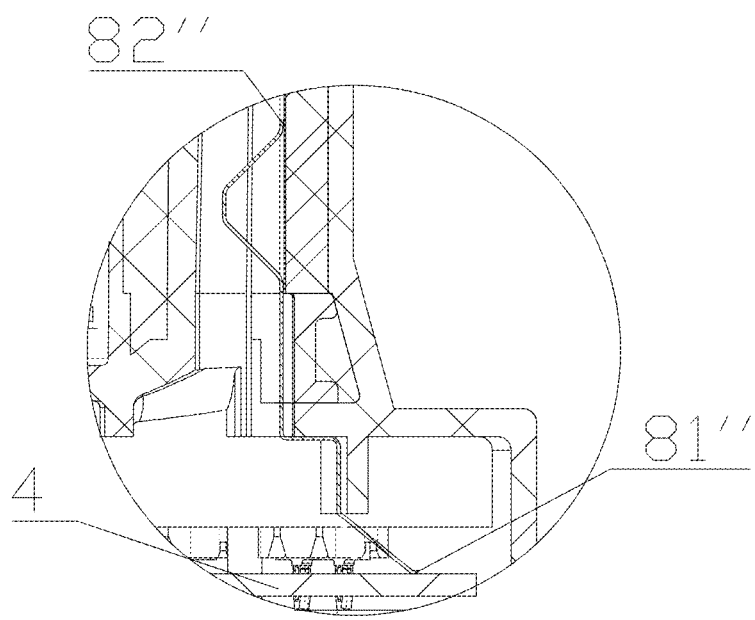
FIG. 16 is a schematic enlarged view of portion C in FIG. 15.
Figure 17:
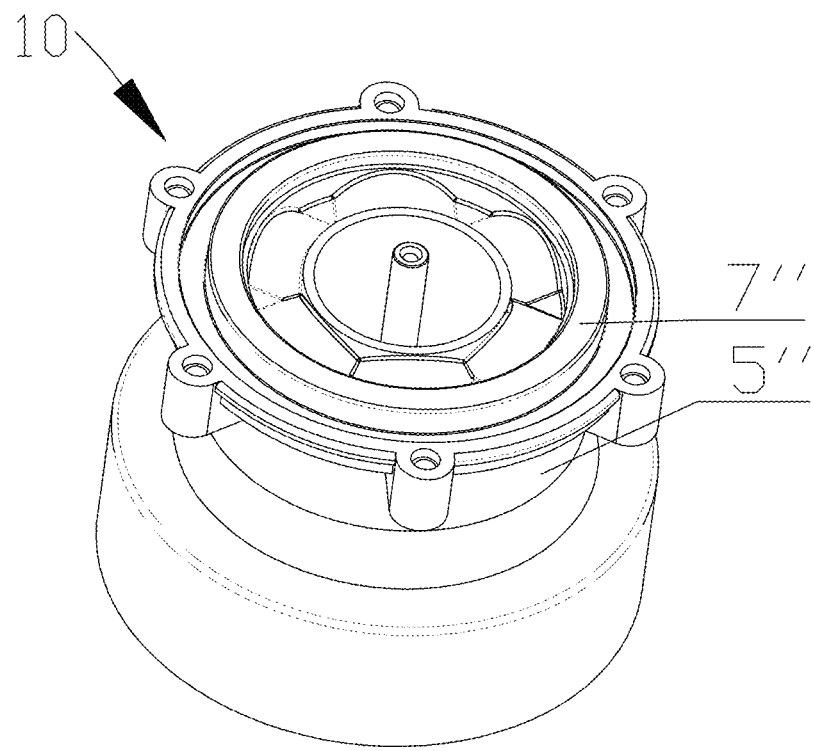
FIG. 17 is a schematic perspective view of a first injection molding member in FIG. 15 from one perspective.
Figure 22:
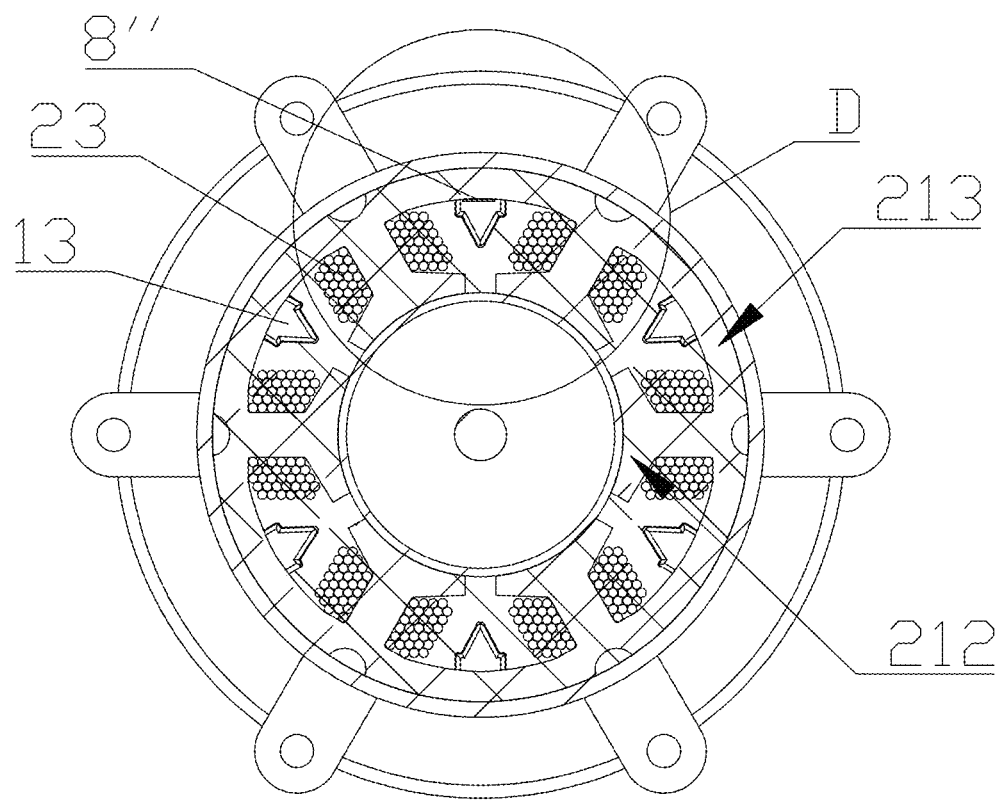
FIG. 22 is a schematic sectional view of FIG. 21 taken along line B-B.

Referring to FIG. 15, FIG. 15 is a schematic structural view of a third embodiment of the electric pump according to the present application, and the structure of the third embodiment of the electric pump will be described in detail below. Referring to FIG. 15, FIG. 16 and FIG. 22, an electric pump 100" includes a conduction member 8". In this embodiment, a first connecting end 81" of the conduction member 8" is connected to the reference ground layer of the electric control board assembly 4, a second connecting end 82" of the conduction member 8" is in contact with the inner circumferential surface 2131 of the iron core yoke portion 213 in FIG. 3, and the second connecting end 82" of the conduction member 8" is located between two adjacent iron core neck portions 211; so that the stator iron core 21, the conduction member 8" and the reference ground layer of the electric control board assembly 4 can form a conductive passage for accumulated charges, which is beneficial to conducting the accumulated charges to the stator iron core 21. Since the stator iron core is connected with the reference ground layer, a potential difference is formed between the stator iron core and the surface of the electric control board assembly, which is beneficial to conducting the accumulated charges on the surface of the electric control board assembly to the stator iron core, reducing the adverse effect of accumulated charges on the electronic components in the electric control board assembly 4, further reducing the adverse effect of accumulated charges on the electric pump and improving the electromagnetic compatibility of the electric pump. The accumulated charges here include static electricity and electromagnetic interference generated by the electric control board assembly itself. Referring to FIG. 15 and FIG. 16, in this embodiment, the conduction member 8" is an integral member. Apparently, the conduction member 8" may be composed of two or more components, which can specifically refer to the first embodiment of the electric pump, and will not be repeated here.

Referring to FIGS. 15 to 20, in this embodiment, at least the stator assembly 2 in FIG. 2 is used as an insert to form a first injection molding member 10 by injection molding. Specifically, in this embodiment, the stator assembly 2 and the pump shaft 3 in FIG. 2 are used as inserts to form the first injection molding member 10 by injection molding, and the "injection molding" here may be injection molding for one time, or for two or more times. Referring to FIGS. 15 to 20, the first injection molding member 10 includes a first housing 5", an separation portion 7" and a limiting portion 9", that is, the first housing 5", the separation portion 7" and the limiting portion 9" are integrally formed, so that only one set of molds is needed, which is beneficial to saving cost.

Referring to FIGS. 18 to 22, the first injection molding member 10 includes a hole portion 13, the hole portion 13 extends along an axial direction of the first injection molding member 10, and a cavity of the hole portion 13 is in communication with the second chamber 90 in FIG. 15; along a circumferential direction of the stator assembly 2, at least one of the above hole portion 13 is provided between two adjacent windings 23; since a plastic portion of the first injection molding member 10 may undergo thermal expansion and contraction under the influence of temperature during the injection molding and/or after injection molding and/or during use, the plastic portion after thermal expansion and contraction may squeeze enameled wires in the windings 23, and an insulating paint layer of the enameled wires in the windings 23 may be damaged by the squeezing force therebetween. However, a certain space is reserved for the thermal expansion and contraction of the plastic portion by providing the hole portion 23, which is beneficial to the deformation of the plastic portion of the first injection molding member 10 toward the cavity of the hole portion 23, reducing the squeezing force of the plastic portion of the first injection molding member 10 on the windings 23, and preventing the insulating paint layer of the enameled wires in the windings from being damaged by the squeezing force of the plastic portion of the first injection molding member 10.

Figure 18:
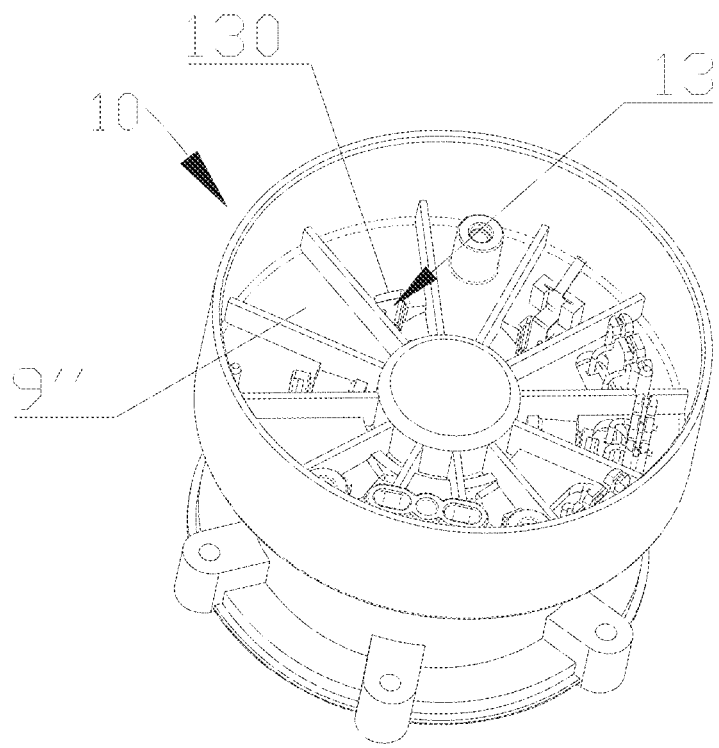
FIG. 18 is a schematic perspective view of the first injection molding member in FIG. 15 from another perspective.
Figure 19:
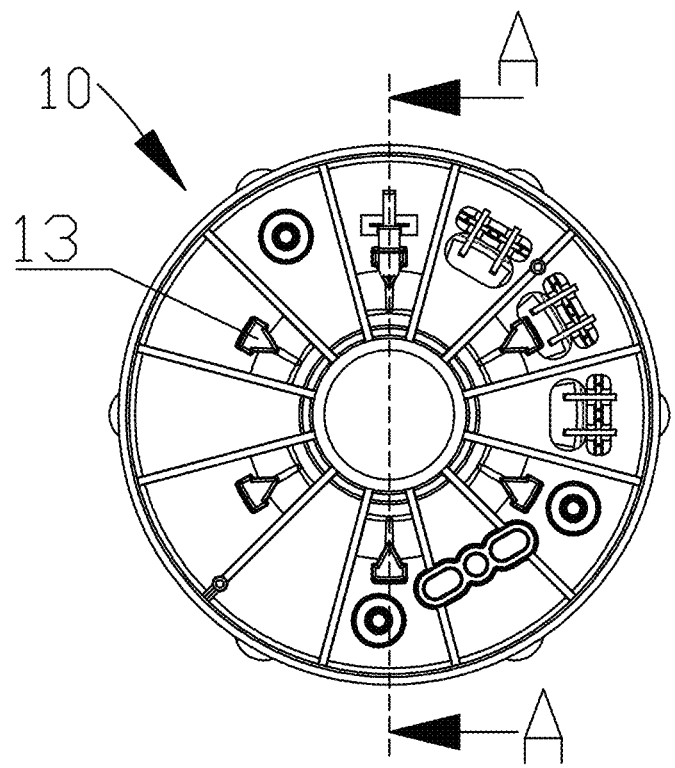
FIG. 19 is a schematic front view of the first injection molding member in FIG. 17 or 18 in one direction.

Referring to FIG. 18, FIG. 19 and FIG. 22, in this embodiment, one hole portion 13 is provided between two adjacent windings 23, and the hole portions 13 are uniformly distributed along the circumferential direction of the stator assembly. Alternatively, two or more hole portions 13 may be provided between two adjacent windings 23.

Figure 20:
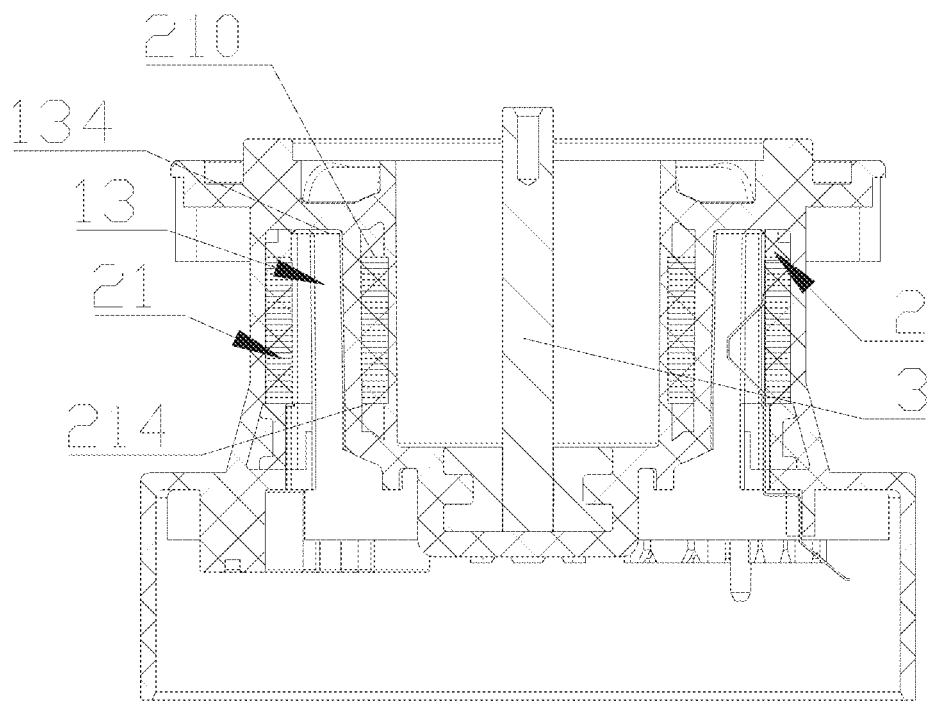
FIG. 20 is a schematic sectional view of FIG. 19 taken along line A-A.

Referring to FIG. 20 and FIG. 22, an axial depth of the hole portion 13 coincides with at least part of an axial length of the winding 23 along an axial direction of the first injection molding member 10. Specifically, referring to FIGS. 18 to 22, in this embodiment, the hole portion 13 is a blind hole, the hole portion 13 includes an opening 130, and the opening 130 faces away from an impeller 12 in FIG. 15. Along an axial direction of the electric pump 100", a bottom wall 134 of the hole portion 13 is closer to the impeller 12 in FIG. 15 than an upper end surface 210 of the stator iron core 21, and the opening 130 of the hole portion 13 is closer to the electric control board assembly 4 in FIG. 15 than a lower end surface 214 of the stator iron core 21, that is, the axial depth of the hole portion 13 is greater than an axial height of the stator iron core 21, which is beneficial to relatively reducing a thickness of the bottom wall 134 of the hole portion 13, so that a wall thickness of the hole portion 13 at the bottom wall 134 and a wall thickness of the hole portion 13 at circumferential side walls of the hole portion are relatively uniform, so as to avoid the formation of contraction cavities in the injection process of the first injection molding member. The "relatively uniform" here means that the wall thickness of the hole portion 13 at the bottom wall 134 is equal to the wall thickness of the hole portion 13 at circumferential side walls of the hole portion, or an absolute value of the difference of the wall thicknesses is less than or equal to 2 mm.

Figure 21:
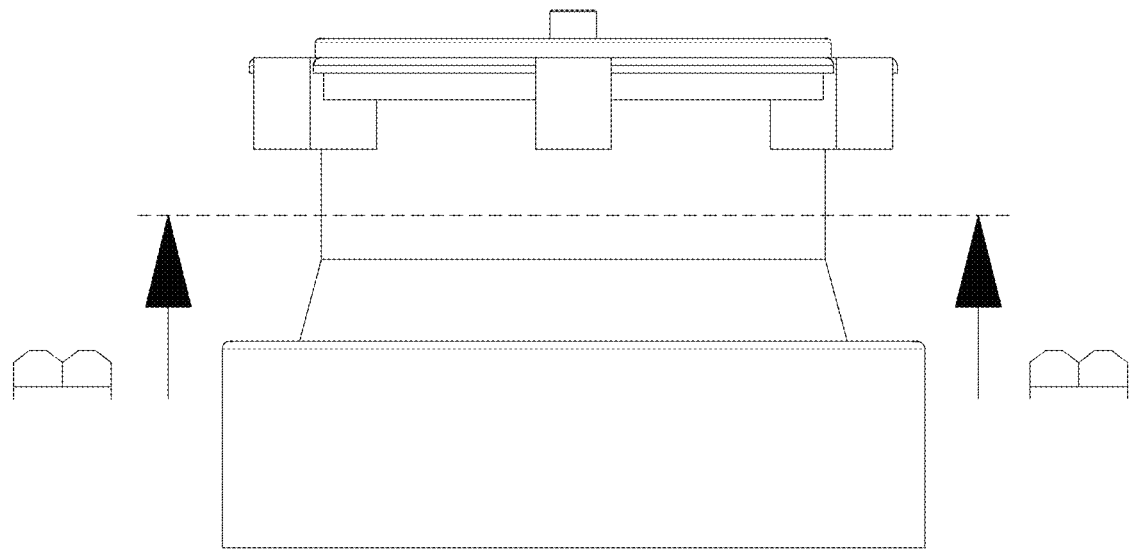
FIG. 21 is a schematic front view of the first injection molding member in FIG. 17 or 18 in another direction.
Figure 23:
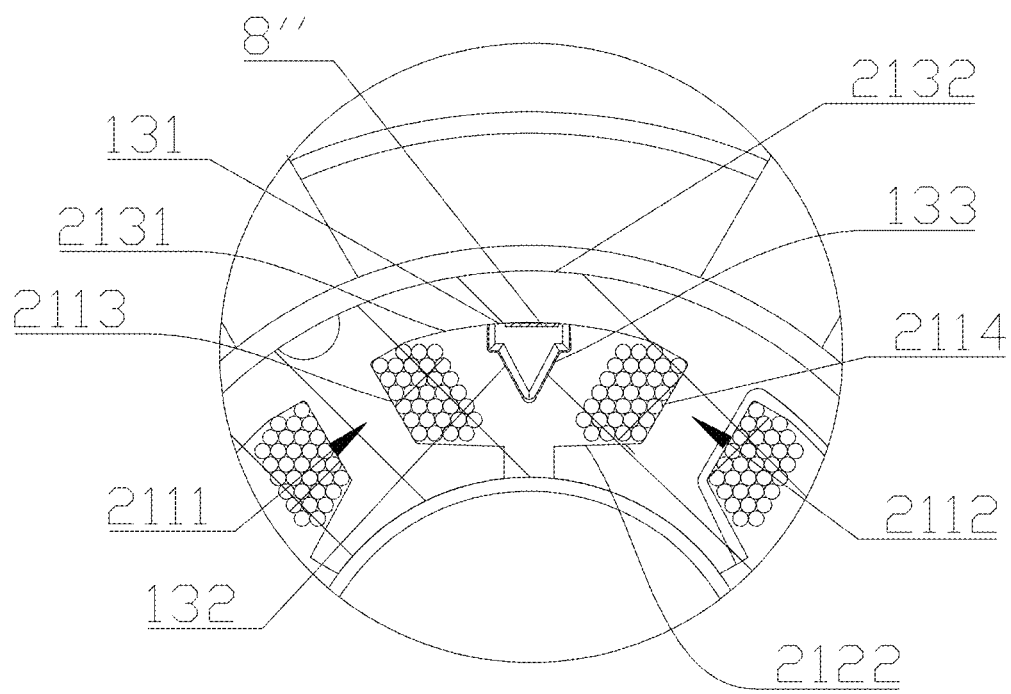
FIG. 23 is a schematic enlarged view of portion D in FIG. 22.

Referring to FIGS. 21 to 23, a cross section of the first injection molding member 10 is taken along a direction perpendicular to a central axis of the stator assembly 2. In the cross section of the first injection molding member 10, for one hole portion 13 and two iron core neck portions 211 adjacent to the hole portion 13, one of the two iron core neck portions 211 is defined as a first iron core neck portion 2111, the other one is defined as a second iron core neck portion 2112, the circumferential side walls of the hole portion 13 include a first side wall 131, a second side wall 132 and a third side wall 133, the first side wall 131 coincides with part of the inner circumferential surface 2131 of the iron core yoke portion 213, that is, the part of the inner circumferential surface 2131 of the iron core yoke portion 213 constitutes the first side wall 131, the second side wall 132 is closer to the first iron core neck portion 2111 than the third side wall 133, the second side wall 132 is parallel to a side wall 2113, closest to the second side wall 132, of the first iron core neck portion 2111, and the third side wall 133 is parallel to a side wall 2114, closest to the third side wall 133, of the second iron core neck portion 2112. The "parallel" here refers to theoretically parallel, however there may be processing errors in the actual processing, and all parallelisms within the range of the processing errors are within the scope of protection of the present application. In addition, in this embodiment, one hole portion 13 is provided between the first iron core neck portion 2111 and the second iron core neck portion 2112, and the first iron core neck portion 2111 and the second iron core neck portion 2112 are symmetrically distributed about a center plane of the hole portion.

Referring to FIG. 23, in this embodiment, a first end of the first side wall 131 is connected to a first end of the second side wall 132, a second end of the first side wall 131 is connected to a first end of the third side wall 133, a second end of the second side wall 132 is connected to a second end of the third side wall 133, and the "connected" may be directly connected or indirectly connected. Specifically, referring to the figure, in this embodiment, the first side wall 131, the second side wall 132 and the third side wall 133 are indirectly connected with each other to form a closed shape.

Alternatively, the first side wall 131, the second side wall 132 and the third side wall 133 may be directly connected with each other, and any two of them may be smoothly and transitionally connected by an arc in the case that the first side wall 131, the second side wall 132 and the third side wall 133 are directly connected with each other, so as to form a hole portion with a cross section like a triangle.

Referring to FIG. 22 and FIG. 23, in this embodiment, the hole portion 13 is arranged along the radial direction of the stator assembly 2 between the outer circumferential surface 2132 of the iron core yoke portion 213 and the outer circumferential surface 2122 of the iron core shoe portion 212, so that the hole portion 13 is relatively close to the windings 23. Specifically, there are three cases, the first case is that: referring to FIG. 22 and FIG. 23, in the inner circumferential surface 2131 of the iron core yoke portion 213 between two adjacent iron core neck portions 211, a part of the inner circumferential surface 2131 has no injection molding layer, and the inner circumferential surface of the iron core yoke portion without injection molding layer constitutes the first side wall 131, that is, the first side wall 131 has no injection molding layer, the stator iron core at the first side wall 131 is exposed, the second side wall 132 and the third side wall 133 are injection molding layers, and in the process of forming the first injection molding member by injection molding, on one hand, the first side wall 131 can be used as a positioning reference surface of the mold, so that the mold can be in contact with the first side wall 131 by extending into the hole portion; on the other hand, referring to FIG. 15 and FIG. 16, the second connecting end 82" of the conduction member 8" extends into the hole portion 13 and is in contact with the first side wall 131, that is, the second connecting end 82" of the conduction member 8" is in contact with the inner circumferential surface 2131 of the iron core yoke portion 213, so that the reference ground layer of the electric control board assembly 4 can conduct electricity with the stator iron core via the conduction member 8"; the second case is that: the first side wall 131, the second side wall 132 and the third side wall 133 are injection molding layers, and in this case at least part of the outer circumferential surface 2132 of the iron core yoke portion 213 has no injection molding layer, so that the outer circumferential surface 2132 of the iron core yoke portion 213 without injection molding layer can be used as a positioning reference surface of the mold when the stator assembly is used as an insert to form an injection molding member by injection molding; the third case is that: the first side wall 131, the second side wall 132 and the third side wall 133 are injection molding layers, and in this case at least part of the inner circumferential surface of the iron core shoe portion has no injection molding layer, so that the inner circumferential surface of the iron core shoe portion without injection molding layer can be used as a positioning reference surface of the mold when the stator assembly is used as an insert to form an injection molding member by injection molding, which specifically can refer to the following fourth embodiment of the electric pump.

Compared with the first embodiment of the electric pump, in this embodiment, the stator assembly 2 and the pump shaft 3 are used as inserts to form the first injection molding member 10 by injection molding, the first injection molding member 10 includes the hole portion 13, and the hole portion 13 is a blind hole. Compared with the first embodiment of the electric pump, the first injection molding member 10 includes the first housing 5", the separation portion 7" and the limiting portion 9", that is, the first housing 5", the separation portion 7" and the limiting portion 9" are integrally formed, so that only one set of molds is needed, which is beneficial to saving cost. Other structures in this embodiment can refer to the first embodiment of the electric pump, which will not be repeated here.

Figure 24:
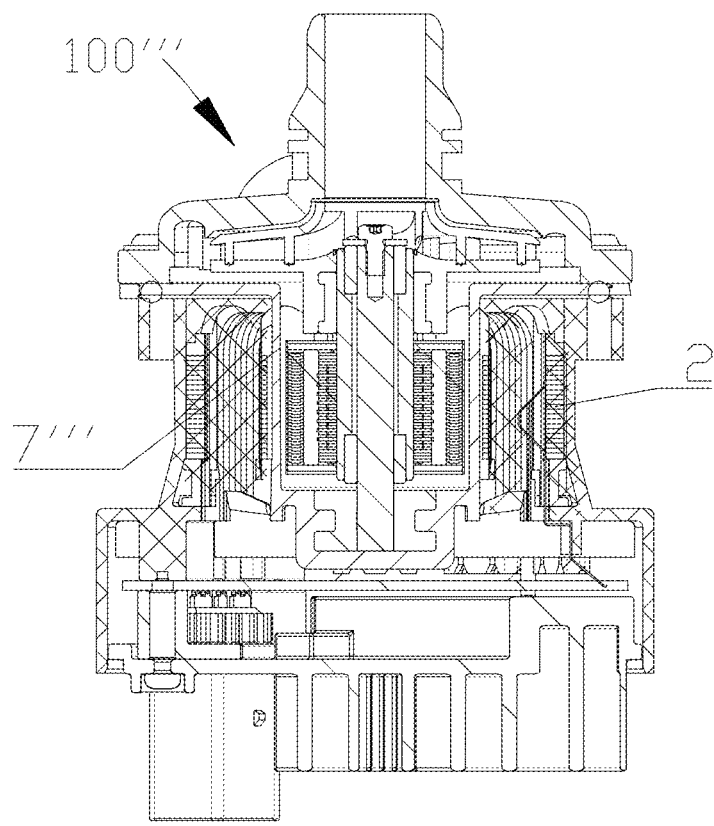
FIG. 24 is a schematic sectional view of a fourth embodiment of the electric pump according to the present application.

Referring to FIG. 24, FIG. 24 is a schematic structural view of a fourth embodiment of the electric pump according to the present application, and the structure of the fourth embodiment of the electric pump will be described in detail below.

Figure 25:
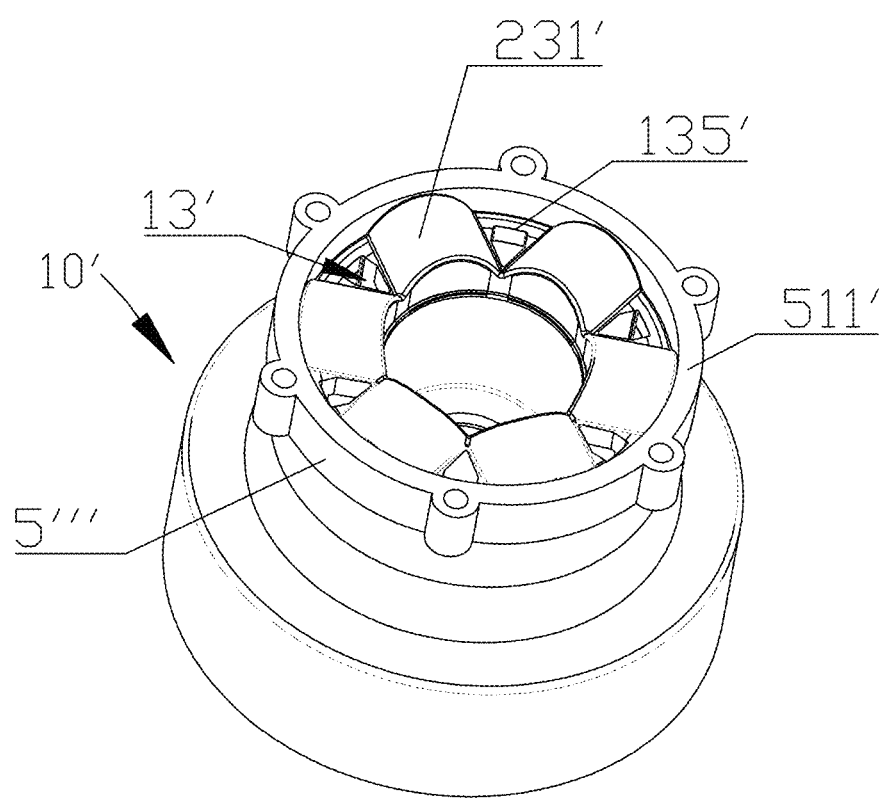
FIG. 25 is a schematic perspective view of the first injection molding member in FIG. 24 from one perspective.
Figure 26:
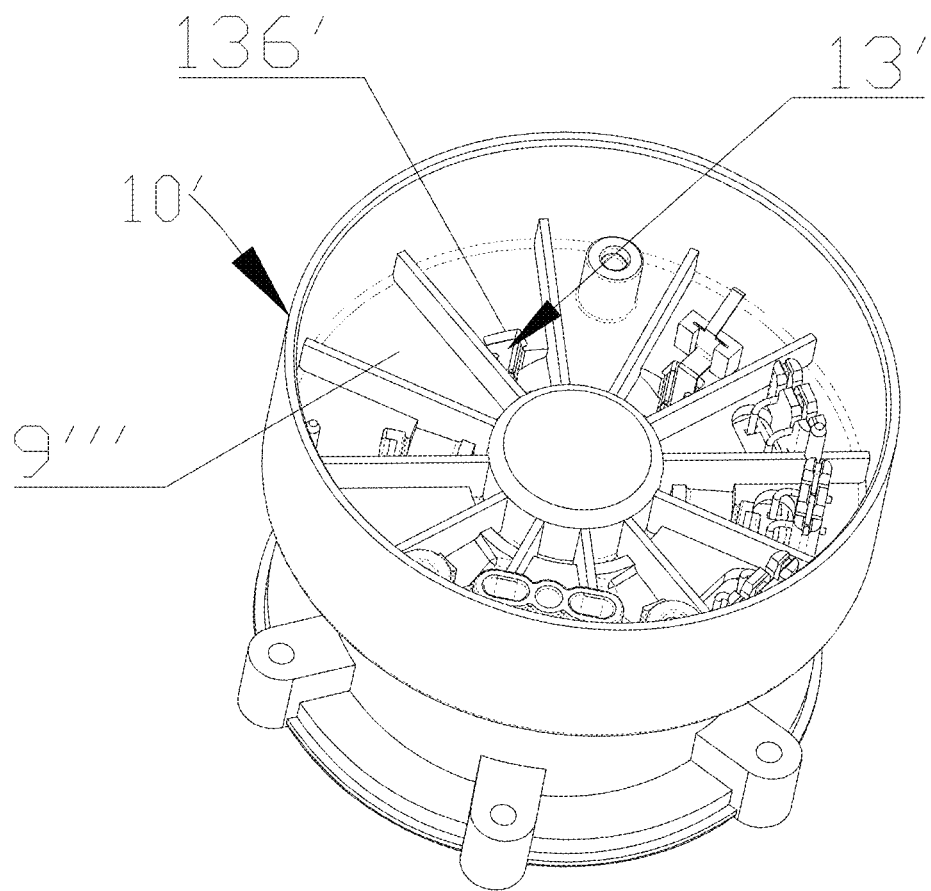
FIG. 26 is a schematic perspective view of the first injection molding member in FIG. 24 from another perspective.

Referring to FIGS. 24 to 26, in this embodiment, the stator assembly 2 is used as an insert to form a first injection molding member 10' by injection molding. The "injection molding" here may be injection molding for one time, or for two or more times. Referring to FIGS. 25 to 26, in this embodiment, the first injection molding member 10' is formed with a first housing 5''' and a limiting portion 9''', that is, the first housing 5''' and the limiting portion 9''' are integrally arranged. In addition, in this embodiment, a separation portion 7''' is separately arranged, and the "separately arranged" means that the separation portion 7''' is separately processed into one component.

Referring to FIGS. 24 to 26, in this embodiment, the hole portion 13' extends along an axial direction of the first injection molding member 10', and the hole portion 13' is a through hole; the hole portion 13' includes a first opening 135' and a second opening 136', the first opening 135' faces toward the impeller, the second opening 136' faces away from the impeller, the first opening 135' is closer to the separation portion 7' than the second opening 136', and the first opening 135' is located below an upper end surface 51' of the first housing 5', which is beneficial to preventing the first opening 135' from interfering with a connection between the first housing 5' and the separation portion 7'. In addition, referring to FIG. 13, in this embodiment, the first opening 135' is located below an injection molding layer 231' at the top of the windings.

Compared with the first embodiment of the electric pump, in this embodiment, the stator assembly 2 is used as an insert to form the first injection molding member 10' by injection molding, the first injection molding member 10' includes the hole portion 13', and the hole portion 13' is a through hole. Compared with the first embodiment of the electric pump, the electric pump in this embodiment is easy to assemble, and other structures in this embodiment can refer to the first embodiment and the fourth embodiment of the electric pump, which will not be repeated here.

It should be noted that, the above embodiments are only intended to illustrate the present application and not to limit the technical solutions described in the present application. Although the present specification has been described in detail with reference to the embodiments described above, it should be understood by those skilled in the art that, various modifications and equivalents can be made to the technical solutions of the present application without departing from the spirit and scope of the present application, all of which should be contained within the scope of the claims of the present application.

What is claimed is:

1. An electric pump, comprising a stator assembly and an electric control board assembly, wherein the stator assembly is electrically connected to the electric control board assembly; the electric pump further comprises a conduction member which is electrically conductive; the stator assembly comprises a stator iron core, and the conduction member is configured to electrically connect a reference ground layer of the electric control board assembly with the stator iron core;

wherein the conduction member comprises a first connecting end and a second connecting end, the first connecting end is electrically connected to the reference ground layer of the electric control board assembly, and the second connecting end is abutted against the stator iron core; and wherein the conduction member is an elastic member, the conduction member comprises an inclined section, a front portion of the inclined section is connected to the second connecting end, the inclined section and the second connecting end are integrally arranged, and the inclined section is closer to the second connecting end than the first connecting end; the electric pump comprises a first housing, at least part of the first housing is located on an outer circumference of the stator assembly, at least part of the inclined section is located between the first housing and an outer circumferential surface of the stator iron core, the inclined section is obliquely arranged with respect to the outer circumferential surface of the stator iron core, and the second connecting end is abutted against the outer circumferential surface of the stator iron core.

2. The electric pump according to claim 1, wherein at least part of a surface of the stator iron core and a surface of the electric control board assembly are located in a same chamber, and an air passage is arranged between the at least part of the surface of the stator iron core and the surface of the electric control board assembly.

3. The electric pump according to claim 2, wherein the electric control board assembly comprises a base board and electronic components arranged on the base board; the base board comprises a first surface and a second surface, and the first surface is closer to the stator assembly than the second surface; the electric control board assembly further comprises an abutting portion, the abutting portion is arranged on the first surface and is electrically connected to the reference ground layer of the electric control board assembly, and the first connecting end is in contact with the abutting portion and is electrically connected to the abutting portion.

4. The electric pump according to claim 1, wherein the electric pump further comprises a conductive member and the conductive member is configured to electrically connect the stator iron core with a surface of the electric control board assembly.

5. The electric pump according to claim 4, wherein the electric control board assembly comprises a base board and electronic components arranged on the base board; the base board comprises a first surface and a second surface, and the first surface is closer to the stator assembly than the second surface; the electric control board assembly further comprises an abutting portion, the abutting portion is arranged on the first surface and is electrically connected to the reference ground layer of the electric control board assembly, and the first connecting end is in contact with the abutting portion and is electrically connected to the abutting portion.

6. The electric pump according to claim 1, wherein the conduction member comprises a first conductive portion and a second conductive portion, and the first conductive portion and the second conductive portion are separately arranged; the first connecting end is formed at a first end of the first conductive portion, the second connecting end is formed at a first end of the second conductive portion, and a second end of the first conductive portion is in contact with a second end of the second conductive portion.

7. The electric pump according to claim 6, wherein at least one of the first conductive portion and the second conductive portion is an elastic member, and the second conductive portion comprises the inclined section; a length of the first conductive portion is defined as a use height when the first end of the first conductive portion is electrically connected to the reference ground layer of the electric control board assembly and the second end of the first conductive portion is in contact with the second end of the second conductive portion, and the use height of the first conductive portion is less than a height of the first conductive portion in a natural state.

8. The electric pump according to claim 7, wherein the electric pump comprises a limiting portion, and the limiting portion is located between the electric control board assembly and the stator iron core; the limiting portion comprises a first limiting groove, the first limiting groove extends along an axial direction of the limiting portion, the first limiting groove comprises a large groove portion and a notch portion, the large groove portion is in communication with the notch portion, and a width of the large groove portion is greater than a width of the notch portion; the conduction member further comprises a first limiting section and a bent section, the first limiting section is integrally connected to the bent section, the first limiting section and the bent section are located between the first connecting end and the second connecting end, the first limiting section is closer to the first connecting end than the bent section, at least part of the first limiting section extends into the large groove portion, a width of the first limiting section is greater than the width of the notch portion, and at least part of the bent section is located in the notch portion.

9. An electric pump, comprising a stator assembly and an electric control board assembly, wherein the stator assembly is electrically connected to the electric control board assembly; the electric pump further comprises a conduction member which is electrically conductive; the stator assembly comprises a stator iron core, and the conduction member is configured to electrically connect a reference ground layer of the electric control board assembly with the stator iron core;

wherein the conduction member comprises a first connecting end and a second connecting end, the first connecting end is electrically connected to the reference ground layer of the electric control board assembly, and the second connecting end is abutted against the stator iron core; and wherein the conduction member is an elastic member, the conduction member comprises an inclined section, a front portion of the inclined section is connected to the second connecting end, the inclined section and the second connecting end are integrally arranged, and the inclined section is closer to the second connecting end than the first connecting end; the electric pump comprises a separation portion, at least part of the separation portion is located on an inner circumference of the stator assembly, at least part of the inclined section is located between the separation portion and an inner circumferential surface of the stator iron core, the inclined section is obliquely arranged with respect to the inner circumferential surface of the stator iron core, and the second connecting end is abutted against the inner circumferential surface of the stator iron core.

10. The electric pump according to claim 9, wherein the conduction member comprises a first conductive portion and a second conductive portion, and the first conductive portion and the second conductive portion are separately arranged; the first connecting end is formed at a first end of the first conductive portion, the second connecting end is formed at a first end of the second conductive portion, and a second end of the first conductive portion is in contact with a second end of the second conductive portion.

11. An electric pump, comprising a stator assembly and an electric control board assembly, wherein the stator assembly is electrically connected to the electric control board assembly; the electric pump further comprises a conduction member which is electrically conductive; the stator assembly comprises a stator iron core, and the conduction member is configured to electrically connect a reference ground layer of the electric control board assembly with the stator iron core;

wherein the conduction member comprises a first connecting end and a second connecting end, the first connecting end is electrically connected to the reference ground layer of the electric control board assembly, and the second connecting end is abutted against the stator iron core; and wherein at least the stator assembly is used as an insert to form a first injection molding member by injection molding, the first injection molding member comprises an injection molding portion, and the injection molding portion covers at least part of an outer surface of the stator assembly; the injection molding portion comprises a hole portion, the hole portion extends along an axial direction of the first injection molding member, and at least one opening of the hole portion faces toward the electric control board assembly; along a circumferential direction of the stator assembly, at least one of the hole portion is provided between two adjacent windings of the stator assembly; an inner circumferential surface of an iron core yoke portion of the stator iron core constitutes a first side wall of the hole portion, and the second connecting end extends into a cavity of the hole portion and is in contact with the first side wall.

12. The electric pump according to claim 11, wherein the conduction member comprises a first conductive portion and a second conductive portion, and the first conductive portion and the second conductive portion are separately arranged; the first connecting end is formed at a first end of the first conductive portion, the second connecting end is formed at a first end of the second conductive portion, and a second end of the first conductive portion is in contact with a second end of the second conductive portion.

\* \* \* \* \*